UNITED STATES PATENT OFFICE.

JONATHAN S. CHATHAM, OF SENECA FALLS, NEW YORK.

IMPROVED COMPOSITION FOR WATER-PIPES, &c.

Specification forming part of Letters Patent No. 37,494, dated January 27, 1863.

*To all whom it may concern:*

Be it known that I, JONATHAN S. CHATHAM, of Seneca Falls, in the county of Seneca and State of New York, have invented a new and Improved Composition for Molding Water-Pipes, Tiles, &c.; and I do hereby declare that the following is a full and exact description thereof.

The object of my improvement is to produce a composition which is cheap and simple in its manufacture, which is hard, will sustain great pressure, is not easily affected by extreme of cold, and which may be readily molded or cast into convenient form of pipe, tile, &c.; and the invention consists in the use of the residuum of burnt coal-tar concentrated to the proper state, having combined therewith the proper admixture of sand of a sharp and gritty nature.

I place a quantity of coal-tar in its natural state in a suitable caldron or other vessel situated over a fire, heating it till its volatile products will inflame. When this point is reached I set fire to the mass and allow it to burn till it is reduced to such a consistency that when perfectly cool it shall be hard without being sticky. This is determined by cooling a little in cold water, and is the test of the proper condition of this element of my composition. When the burnt tar is thus reduced to the proper condition clean sharp sand—such as is generally used in making mortar for building purposes—is mixed with it by gradually stirring the mass. The sand is added as long as the tar will receive it and still retain sufficient fluidity to run or flow while hot to be molded or cast.

The mixture thus formed may be cast in suitable molds, made of sand or otherwise, into water-pipes of large or small sizes, drain-tiles, &c. It is particularly adapted to the making of pipes for the conduction of water, being very cheap, easily made, impervious to moisture, not easily affected by frost, very enduring under friction, and of great strength to resist pressure. It does not require to be kiln-dried, as is the case with clay pipe, but on being removed from the molds soon hardens to almost the firmness and consistency of stone. In fine casting for some uses the material may be pressed in the molds.

The removal of the inflammable and volatile properties by positive burning of the coal-tar, as above described, is essential to the forming of the perfect concrete, as its essential qualities cannot be in a great degree attained by slow boiling or heating. The residuum thus obtained by a quick process is of great density and hardness, and when mixed with the sand is almost wholly deprived of its unpleasant smell, and the cement thus formed is unaffected by the extremes of hot and cold weather, and, being impervious to water, resists the action of frost in all situations.

What I claim as my invention, and desire to secure by Letters Patent, is—

The composition above described, consisting of the residuum of burnt coal-tar and sharp sand, prepared and compounded substantially as and for the purposes specified.

In witness whereof I have hereunto signed my name in the presence of two subscribing witnesses.

JONATHAN S. CHATHAM.

Witnesses:
RICHARD H. WEIR,
F. W. HENRY.